United States Patent [19]

Thiboutot

[11] 4,365,908

[45] Dec. 28, 1982

[54] FOLDING JOINT FOR INTERCONNECTING ELONGATE MEMBERS

[75] Inventor: Robert Thiboutot, Lac St. Charles, Canada

[73] Assignee: Les Entreprises Rotot Ltee, Comte de Bellechasse, Canada

[21] Appl. No.: 217,219

[22] Filed: Dec. 17, 1980

[51] Int. Cl.³ ................. F16C 11/00; F16D 1/12; F16D 3/00
[52] U.S. Cl. .................. 403/102; 135/109; 403/328
[58] Field of Search .............. 403/102; 135/4 R; 16/297, 302, 355, 361, 374

[56] References Cited

U.S. PATENT DOCUMENTS

| | | |
|---|---|---|
| 521,546 | 6/1894 | Oat, Sr. . |
| 694,097 | 2/1902 | Freuler . |
| 2,149,059 | 2/1939 | Leon . |
| 2,192,830 | 3/1940 | Gerdes . |
| 2,219,358 | 10/1940 | Economides . |
| 2,630,730 | 3/1953 | Thornton ............... 403/328 X |
| 2,662,681 | 12/1953 | Stapleton . |
| 2,712,664 | 7/1955 | McNeill . |
| 2,793,387 | 5/1957 | Odell . |
| 2,915,328 | 12/1959 | Walton ....................... 403/102 |
| 3,066,320 | 12/1962 | Russell . |
| 3,367,348 | 2/1968 | Kirkham ................... 135/4 R |
| 3,470,579 | 10/1969 | Cencioni . |
| 3,929,146 | 12/1975 | Maiken ..................... 135/4 R |
| 4,069,524 | 1/1978 | Carlo . |

Primary Examiner—Wayne L. Shedd
Attorney, Agent, or Firm—Fleit & Jacobson

[57] ABSTRACT

A joint for interconnecting confronting end portions of two elongate members so that the elongate members are movable between first and second positions. In the first position, the elongate members are releasably locked in a coaxial, erect supporting position in which confronting end portions of the members are closely spaced from each other. In the second position, the elongate members are spaced from and substantially parallel to each other. The hinge includes a central block member having a generally U-shaped profile, with guide surfaces and cam slots in its flanges. Guide members having similarly shaped guide surfaces and cam slots are connected in pairs to opposite ends of the block member and cooperate with the guide surfaces and cam slots to control movement of the tubular members between the first and second positions.

6 Claims, 6 Drawing Figures

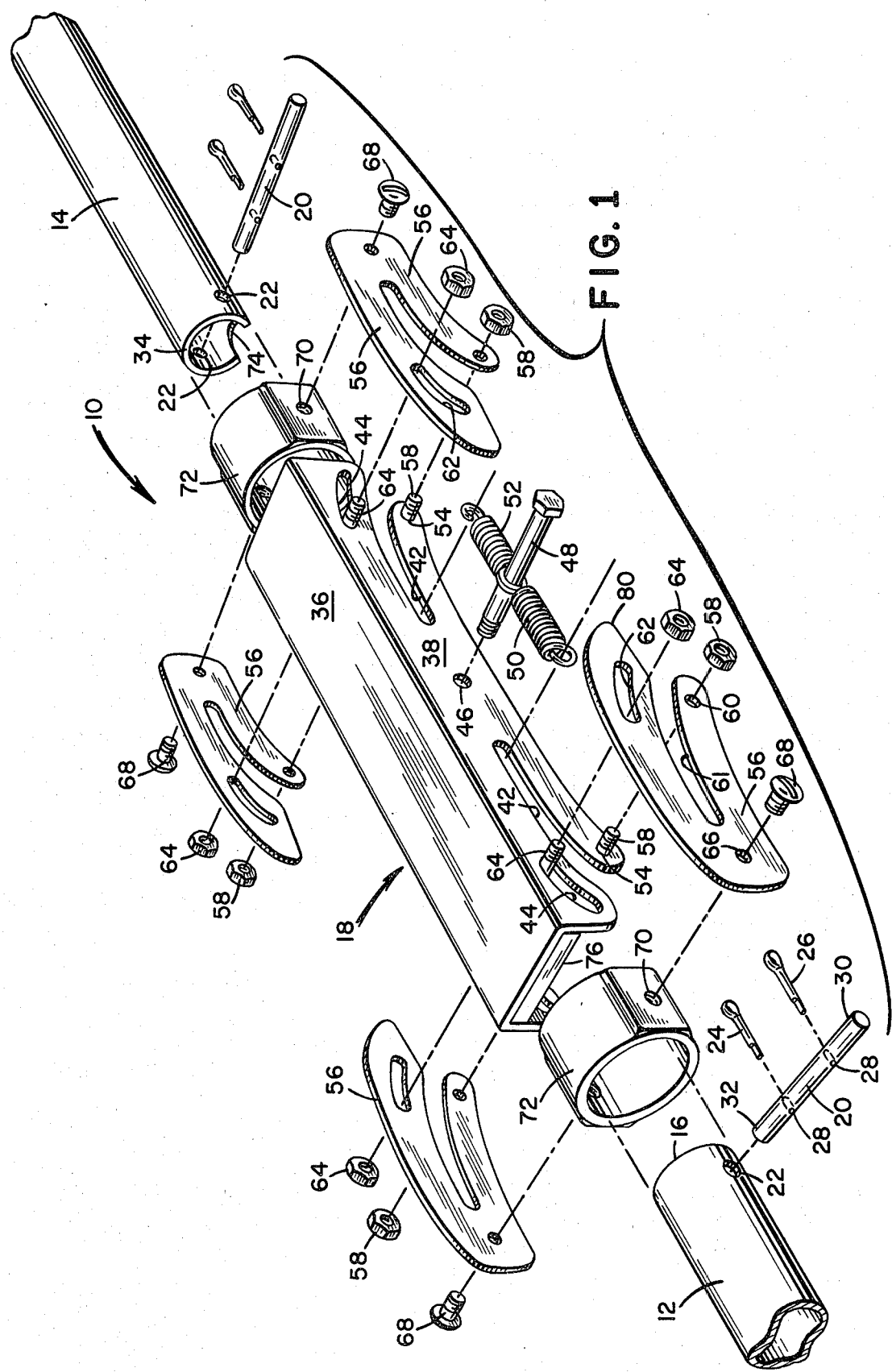

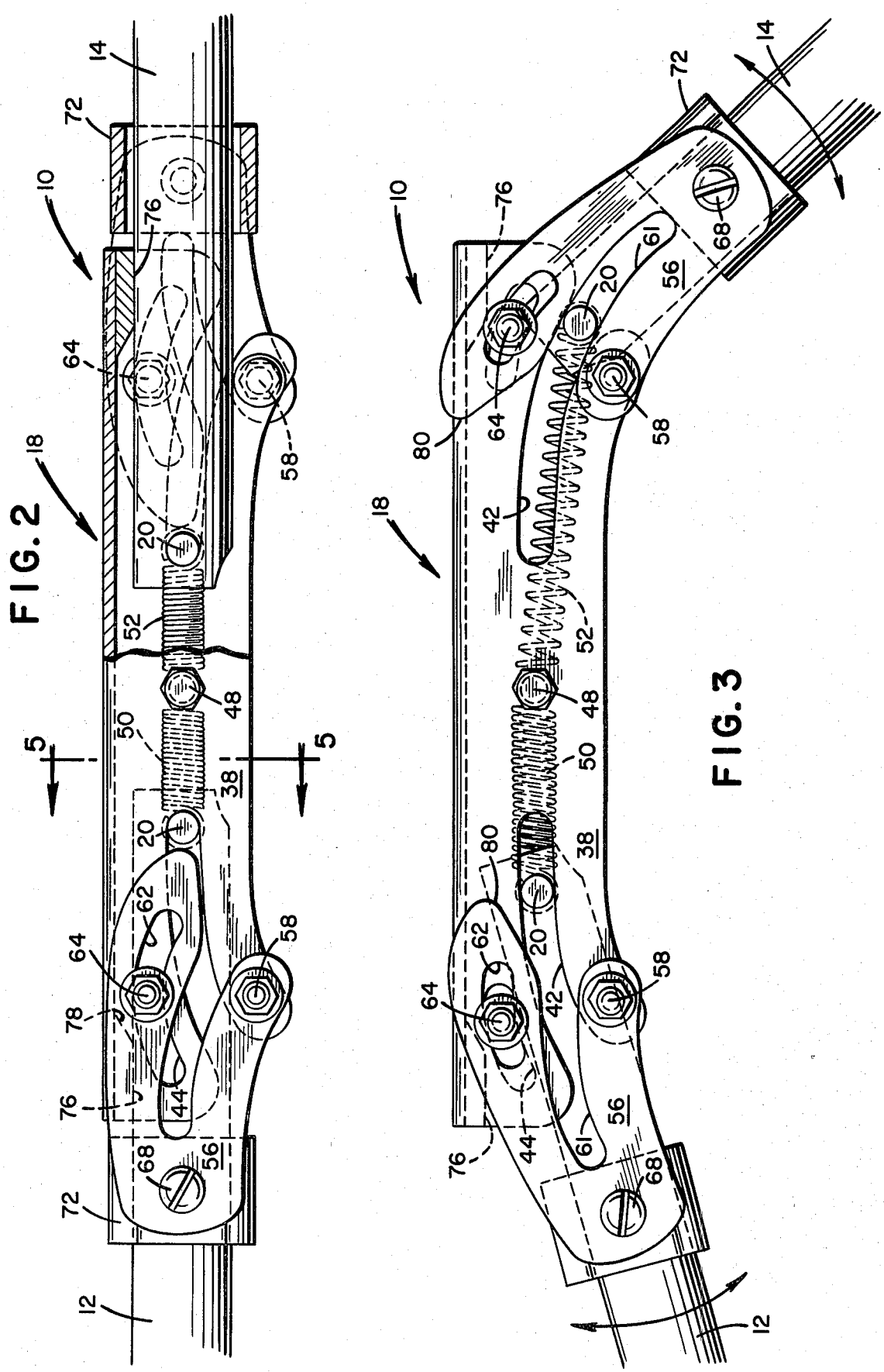

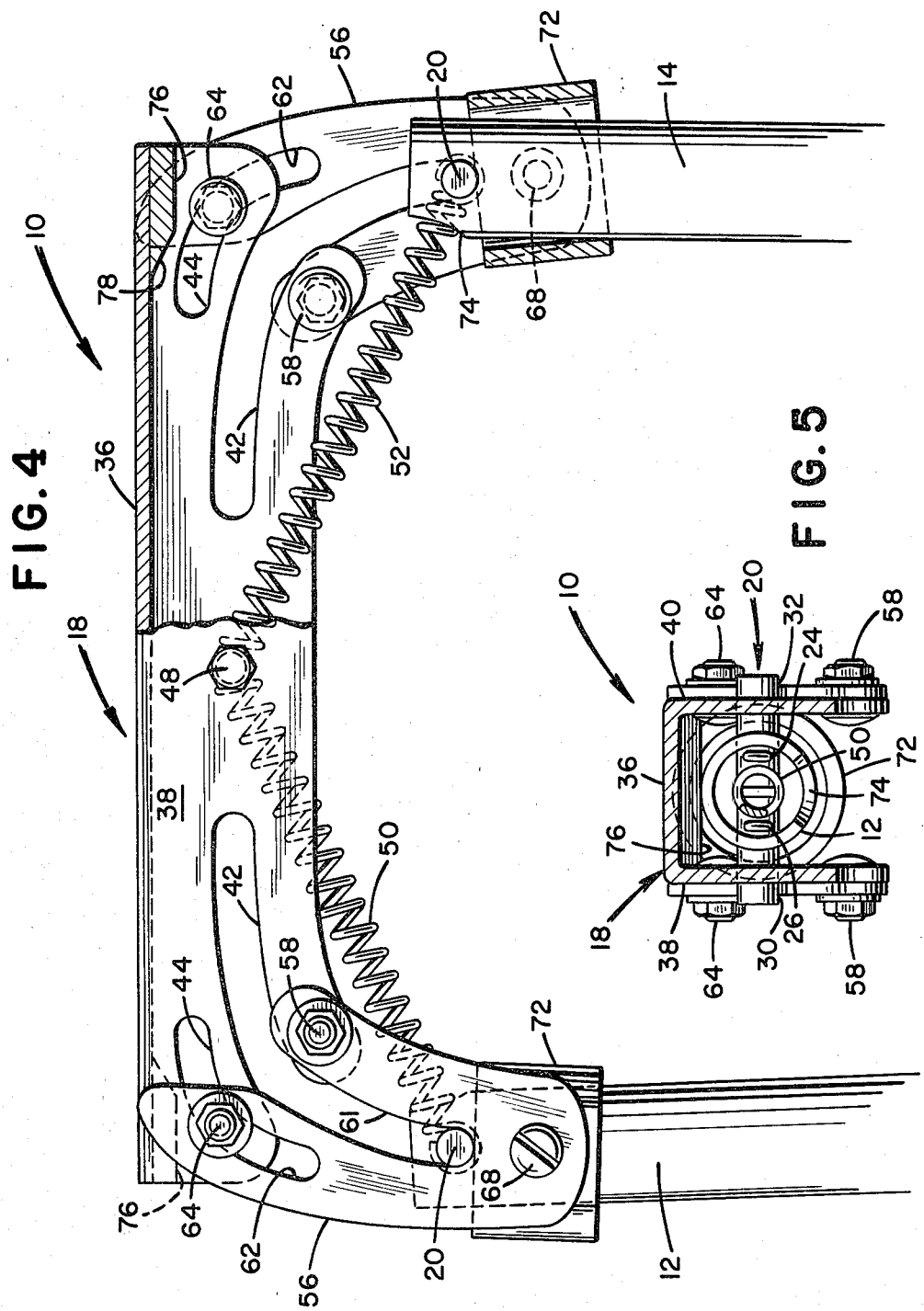

FOLDING JOINT FOR INTERCONNECTING ELONGATE MEMBERS

BACKGROUND OF THE INVENTION

1. Field of the Invention

The present invention relates to folding joints or hinge members for interconnecting confronting ends of elongate members. More particularly, the invention provides a folding joint for interconnecting confronting ends of relatively large tubular members. Such folding joint makes it possible to move the tubular members between an aligned, horizontal position, and a parallel, collapsed position. During movement from the first to the second position, the ends of the tubular members are moved away from each other to provide clearance between the members in the collapsed position.

SUMMARY OF THE INVENTION

The present invention provides a folding joint or collapsing hinge for interconnecting confronting ends of two elongate members for movement between first and second positions. In the first or erect position, the tubular members are held in a position in which their confronting ends are closely spaced from each other and the members are substantially coaxial. In the second position, the tubular members are spaced from each other and substantially parallel. During movement between the first and second positions, the tubular members are moved away from each other to increase clearance for other components of the structure connected to the members.

The joint of the present invention has numerous uses. For instance, when the joint is used with a folding sled, the joint provides a slim design whose dimensions are only slightly greater than the dimensions of the members interconnected by the joint. When the sled using the joint is erected, there are no long protruding members hanging from the joint that might come in contact with foreign objects, such as compacted snow, ice formations, tree branches, rocks, or uneven ground.

Another advantage provided by the joint of the present invention is that it is designed to be automatically locked in its erect position to prevent undesired longitudinal movement between the interconnected members.

A third advantage of the joint provided by the present invention is that its components are interconnected with sufficient tolerance to allow relatively easy positioning of the hinge over the ends of the tubular members when the mechanism is collapsed.

Still another advantage of the joint is that it offers great strength when a force is applied downwards on the central portion of the joint because a longitudinally-extending portion of each of the tubular members is in contact with a portion of the joint and a pin connected to each of the tubular members is in contact with grooves formed in flanges of the joint. Further, the hinge has flanges that are movable into contact with portions of the interconnected tubular members to resist sideway forces applied against the joint.

A still further advantage provided by the present joint is the use of a floating pin that is movable in overlapping cam slots between two extreme positions to control the movement of guide members between a first position when the joint is in an erect supporting position and a second position when the joint is collapsed.

Considering the present invention in more detail, it provides a joint for interconnecting confronting end portions of two elongate or tubular members so that the members are movable between the first and second positions. In each other and have their confronting end portions spaced a relatively small distance from each other, while in the second position the elongate members are parallel to and spaced from each other. The hinge includes a longitudinally-extending yoke or central block member that is generally U-shaped and has a base with two downwardly extending flanges. Each of the flanges has a pair of guide passages formed therein that extend inwardly and upwardly from lower outer edges of the flange. Cam slots are formed in the flanges above each of the entrances to the guide passages. Guide members are pivotally connected to each lower outer edge of the flanges below the entrances to the guide passages. Each of the guide members has a guide passage with an entrance that communicates with the entrance to one of the guide passages in the flange and a cam slot that at least partially overlaps the respective cam slot in the flange. The guide passages in the flange and guide member cooperate with each other to define a first guide path that traverses 90°. The horizontal length of the guide path is so selected that the ends of the tubular members can be moved apart from each other a sufficient distance to provide required clearance for collapsing motion of the hinge. The cam slots in the flange and the guide member are shaped to cooperate with each other to limit movement of the guide member to an arc of 90°. For this purpose, a pin is received in the overlapping portions of the cam slots. Each of the end portions of the tubular member carries a pin having outer ends forming followers that are received in the guide paths formed by the cooperating guide passages of the flange and guide member. A guide sleeve encompasses the tubular member and is connected to pairs of the guide members in such manner that movement of the members away from the hinge is limited by contact of the follower portions of the pins with the guide sleeve. It will also be appreciated that such movement can be limited by appropriate design of the guide passages formed in the guide members. Springs are interconnected between a central portion of the central block member and the elongate members in such manner that the members are urged towards the center of the block member. Also, the guide members have extensions shaped to releasably lock the follower portions of the pins against movement when the tubular members are in the first position.

The invention, and its objects and advantages, will become more apparent in the detailed description of the preferred embodiments hereinafter presented.

BRIEF DESCRIPTION OF THE DRAWINGS

In the detailed description of the preferred embodiments of the invention hereinafter presented, reference is made to the accompanying drawings, in which:

FIG. 1 is a schematic exploded perspective view of one embodiment of a folding joint according to the present invention;

FIG. 2 is an assembled view of the folding joint of FIG. 1 used to hold two tubular members in alignment with each other;

FIG. 3 is a view similar to FIG. 2 illustrating the tubular members in a partially collapsed position;

FIG. 4 is a view illustrating the tubular members of FIG. 2 in a collapsed, fully folded position;

FIG. 5 is a view along line 5—5 of FIG. 2; and

DESCRIPTION OF THE PREFERRED EMBODIMENTS

Figure 6:
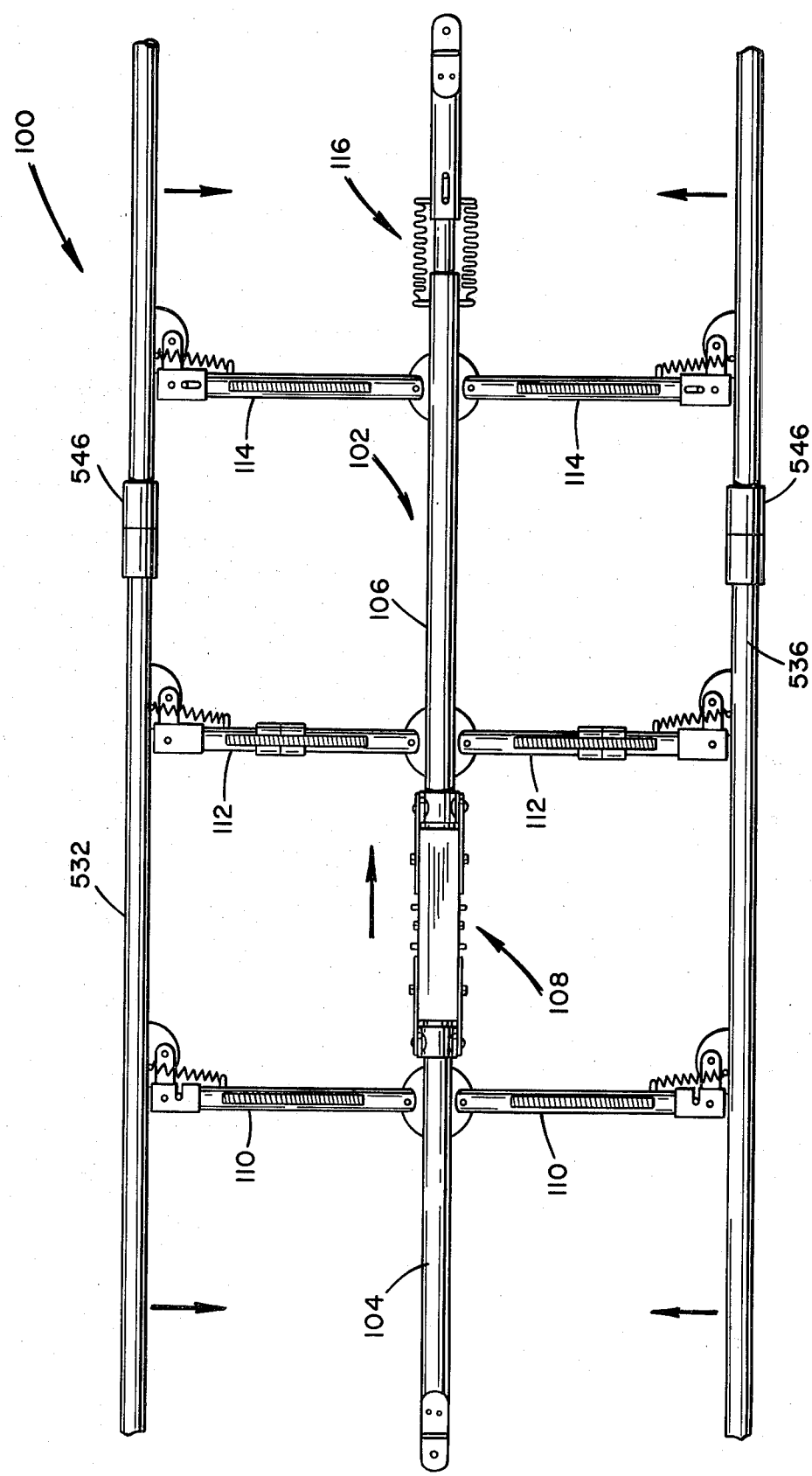
FIG. 6 is a top plan view of the folding joint of FIG. 1 incorporated in a support structure of a folding collapsible sled.

Because folding joints are well-known, the present description will be directed, in particular, to elements forming part of, or cooperating more directly with, the present invention. Elements not specifically shown or described herein are understood to be selectable from those known in the art.

In the following description, terms such as "horizontal" and "vertical" will be used in conjunction with the structure illustrated in the drawings. Such terms are not intended to limit the structure to a particular orientation. It should be readily apparent that the folding joint provided by the present invention can be used to hold two members in alignment with each other in a vertical position, a horizontal position, or a position skewed to the horizontal.

Referring now to the drawings, and to FIG. 1 in particular, one embodiment of the present invention is illustrated and will be described in connection with a folding joint, generally designated 10.

The folding joint 10 is interposed between and connected to confronting end portions of two members 12 and 14. Preferably, the members are elongate, hollow tubular members. The folding joint 10 has an elongate yoke or central block member 18 designed to support the tubular members in a first, erected position in which the members form a horizontal support. The members 12 and 14 are movable from the first position into a second, collapsed or folded position in which the tubular members are substantially parallel to each other, as illustrated in FIG. 4.

The tubular member 12 has an end portion 16 receiving a pin 20 through diametrically-aligned openings 22. The position of the pin is fixed with respect to the tubular member 12 by cotter keys 24 and 26 that pass through openings 28 formed in the pin 20. As illustrated in FIG. 5, end portions 30 and 32 of the pin 20 project beyond the sides of the tubular member 12 and form followers that guide movement of the tubular member 12 in a manner to be hereinafter described.

The tubular member 14, like the tubular member 12, has an end portion 34 supporting a pin 20. Since the pin is connected to the end portion 34 in the same manner the pin 20 is connected to the end portion 16, the same reference numerals have been used to identify the pin, openings, and cotter keys used to connect pin 20 to end portion 34.

The block 18, as best seen in FIGS. 1 and 5, is a generally U-shaped member having a generally horizontal base portion 36 and generally vertical flange portions 38 and 40. Each of the flange portions is formed with a first pair of open-ended cam or guide surfaces 42 and a second pair of closed cam or guide surfaces 44. The flange 38 has an opening 46 formed therein that is in alignment with a similar opening (not shown) in flange 40. The openings receive therethrough a pin or shaft 48 that provides means for connecting confronting, proximal ends of biasing means or springs 50 and 52 to a central portion of block 18. Openings 54 are formed in portions of each of the flanges located below and close to the open ends of the guide surfaces 42 for receiving bolts pivotally connecting a plurality of guide members 56 to the block member 18. A bolt or rivet 58 is inserted through an opening 60 in each of the members 56 and through one of the openings 54 in the flanges of the block member. The axes of the bolts form pivot axes for the guide plates. Each of the members 56 has an open cam or guide surface 61 that cooperates with one of the guide surfaces 42 to control movement of one of the end portions (30, 32) of pin 20. Each of the members 56 also has a closed cam surface 62 formed therein that receives a floating pin 64. The pin 64 also is received in one of the cam surfaces 44. As can be seen from FIGS. 2 to 4, different portions of the cam surfaces 44 and 62 are in alignment during movement of the tubular members 12 and 14 between their erect and folded positions. These surfaces cooperate with each other to limit rotation of guide members 56 to arcs of approximately 90°.

The members 56 also have openings 66 that receive therethrough threaded fasteners 68 that are received in threaded openings 70 formed in guide sleeves 72. Preferably, the guide sleeves 72 are pivotally connected to the members 56. As can be seen from FIG. 4, the pins 20 are positioned between the guide sleeve 72 and the central block member 18. Also, the distal ends of the springs 50 and 52 are connected to the pins 20. Recesses 74 are formed in lower regions of the end portions 16 and 34 to provide clearance for the springs, as illustrated in FIG. 4.

While the springs 50 and 52 have been described as being connected between the bolt 48 and the pins 20, it should be readily apparent that other means of connection are suitable. For instance, downwardly extending hooks or protrusions (not shown) provided on the tubular members 12 and 14 in the vicinity of the openings 22 can be used for connecting the distal ends of the springs to the tubular members. Similarly, a protrusion or protrusions extending downwardly from base 36 or from one or both of the flanges 38, 40 could be used to connect the springs to central block member 18. Thus, any method of connecting the springs can be used that ensures that the springs bias the tubular members into their horizontal positions.

Referring now to FIGS. 1 and 2, it can be seen that guide plates 76 are connected to or formed integral with the base 36 of the central block member 18 at its outer end portions. The inner edges 78 of the guide plates 76 are beveled to provide clearance for the ends of the tubular members 12 and 14 during their movement with respect to the central block member. The guide plates 76 provide horizontally-extending planar guide surfaces that contact uppermost portions of the tubular members 12 and 14 in order to hold the tubular members substantially horizontal. Further, the members 56 have extensions 80 that form blocking members for limiting movement of the pins 20 with respect to the guide surfaces 42. Thus, the guide plates 76 and the extensions 80 cooperate with each other to hold the tubular members 12 and 14 in a locked, horizontal supporting position.

The assembly of the folding joint 10 will now be described with specific reference to FIG. 1. While a particular sequence of assembly operations will be described, it will be appreciated that such description is intended to be illustrative of only one of many possible assembly techniques. Numerous other techniques are within the purview of the present invention. Also, since the right and left sides are mirror images of each other, the assembly of only one side will be described.

First, an end of the bolt or shaft 48 is passed through an opening 46 in one of the flanges 38 or 40 of the base member 36. The proximal ends of springs 50 and 52 are positioned on the shaft and then the end of the shaft is passed through the opening in the other flange and secured in position. Next, the end portion 16 of the tubular member 12 is passed through the guide sleeve 72 and one of the ends of pin 20 is inserted through one of the openings 22, through the distal end of the spring 50, and through the other opening 22 in the opposite side of the tubular member. Cotter keys 24 and 26 then are inserted through the openings 28 to maintain the spring centered on the pin 20 and to maintain the pin centered with respect to the tubular shaft. Members 56 are then pivotally connected to the flanges 38 and 40 by insertion of bolts or rivets 58 through aligned openings 54 and 60. Similarly, floating pins 64 are positioned in overlapping portions of the cam surfaces 44 and 62. Fasteners 68 are then inserted into aligned openings 66 and 70 to connect the members 56 to the guide sleeve 72.

Starting with the arrangement illustrated in FIG. 4, the operation of the folding joint 10 will now be described. As illustrated in FIG. 4, the tubular members 12 and 14 are located in their second position in which the members are spaced from each other with their axes substantially parallel. The distance between the axes is substantially equal to the length of the base 36 of the block member 18. In this position, the end or follower portions of the pin 20 are located in the lowermost portions of the cam surfaces 61 of the members 56. The springs 50 and 52, which pass through the recesses 74 in the bottom of the tubular members, are exerting forces on the pins 20 tending to move the pins towards the guide surfaces 42. The weight, however, of the tubular members and the structure supported by the members is such that movement is prevented. It should also be noted that the floating pin 64 is positioned in a lowermost portion of the cam surface 44 and an uppermost portion of the cam surface 62. Thus, the cam surfaces 44 and 62 cooperate with each other to provide means for positioning the guide members 56 in second positions corresponding to the second positions of the tubular members. The axes of the tubular members 12 and 14 form substantially right angles with the plane of the base 36 of the block member 18. Movement of the tubular members away from the block member is prevented by engagement between the pins 20 and the guide sleeves 72, by engagement between the pins 20 and the inner ends of the guide surfaces 61, or by engagement of the pins with both the guide sleeves and guide surfaces.

Referring now to FIG. 3, the right-hand side of this figure illustrates an orientation of the components of the folding joint 10 such that the guide surfaces 42 and 61 form a substantially continuous surface for guiding movement of the follower portions of the pins 20. The springs 50 and 52 exert forces on the pins 20 tending to move them from the guide surfaces 61 onto the guide surfaces 42.

As illustrated in the left portion of FIG. 3, the tubular member 12 has moved to a position in which the follower portion of the pin 20 is guided only by the guide surface 42. The pin 20 has been moved by the spring 50 and movement of the tubular member during erection into a position in which the extension 80 of the member 56 will clear the pin 20 during subsequent movement of the member 56. It should be noted that in both of the positions illustrated in FIG. 3 that the floating pin 64 is located intermediate the ends of the guide surface 44 and intermediate the ends of the guide surface 62.

Finally, as illustrated in FIG. 2, the tubular members are moved into their first position, that is, a position in which the members are held in an aligned, substantially horizontal support position. During movement of the tubular members between the position illustrated in FIG. 4 and that illustrated in FIG. 2, the cam surfaces 44 and the cam surfaces 62 are positioned so that the pins 64 are free to float and do not interfere with movement of the guide members 56. The cam surfaces 44 and 62 cooperate with each other and the bolt 64 to provide means for positioning the guide members 56 in a first position corresponding to the first position of the tubular members. When the guide members are held in the first position, they hold the sleeves 72 in substantially horizontal positions. Should a large vertical force be applied to block member 18, the sleeves 72 would transmit such force to portions of the tubular members 12 and 14. During movement of the tubular members into their first positions, the end portions 16 and 34 of the tubular members are gradually moved towards each other through the guiding action provided by the guide surfaces 61 of the members 56 and the guide surfaces 42 of the block member 18. Such movement is facilitated by the rotation of the guide sleeves 72 which form guide means for the tubular members. Also, by varying the length of the guide surfaces 42, it is possible to vary the spacing between the confronting ends of the tubular members.

Previously, the cam surfaces 44 and 62, together with the pins 64, have been described as providing means for controlling or limiting movement of the guide members 56 between first and second positions corresponding to the first and second positions of the tubular members 12 and 14. It should be readily apparent that other means could be provided for limiting movement of the guide members 56. For instance, protrusions or ridges could be positioned under each of the guide surfaces 42 in the block 18 such that contact between the extensions 80 and ridges limits movement of the members 56. Similar blocking surfaces could be positioned on other parts of the block 18 to limit movement of the members 56 to their second position.

Referring now to FIG. 6, one representative use of the folding joint provided by the present invention is illustrated. FIG. 6 illustrates a support structure, generally designated 100, that is usable with a folding collapsible sled of the type described in U.S. patent application Ser. No. 960,444, filed Nov. 13, 1978, for "Collapsible Support Devices and Structure", the contents of which are herein incorporated by reference. FIGS. 14 to 29 of this co-pending application describe a folding collapsible sled that is movable between an erected position and a collapsed and folded position. FIG. 6 of the present application illustrates a modification of the sled described in the co-pending application that incorporates a foldable base or support structure 100 for supporting articles carried by the sled. The support structure is positioned between and connected to horizontal side members, similar to the side members identified with the reference numerals "532" and "536" in the co-pending application. Each of the horizontal side members is formed of two members hingedly connected to each other by a hinge mechanism similar to the hinge mechanism designated "546" in the co-pending application. For the purposes of convenience, the same reference numerals have been used in FIG. 6.

Centrally located between the two side members is a central support member, generally designated 102, formed of two tubular members 104 and 106 interconnected to each other by a folding joint, generally designated 108, similar to the previously described folding joint 10. Pairs of lateral braces 110, 112, and 114 interconnect the central support member with the horizontal side members. Ends of the lateral braces are pivotally connected to respective portions of the side members and the central support member. Also, the lateral braces 112 incorporate hinges so that the braces 112 can be folded together with the hinges 546 and the joint 108 during collapsing movement of the sled. Preferably, the central support member incorporates a shock absorbing mechanism, generally designated 116.

The folding joint provided by the present invention provides several advantages when utilized with a folding sled. A first advantage is that the joint provides a very slim design in its opened, support position. As can be seen from FIG. 5, the external dimensions of the folding joint are only slightly larger than the outside diameters of the tubular members. When the sleigh is erected, there are no long downwardly protruding members hanging underneath the joint that might come in contact with foreign objects, such as compacted snow, ice formations, tree branchs, rocks, and the like. Another advantage provided by the joint is that it locks automatically in place in the opened position through the interaction of the springs 50 and 52 and the movement of the projections of the members 56 into blocking positions. The prevention of longitudinal movement of the tubular members 12 and 14 provides a very safe joint. Still another advantage of the joint is that there is a relatively large amount of free play provided between the components during movement into the position illustrated in FIG. 4 which facilitates the positioning of the central block member 18 above the ends of the tubular members 12 and 14. It should be noted that the tubular members pass through the guide sleeves with a slight clearance, that the guide sleeves are rotatable with respect to the tubular members, and that there is no positive connection between the tubular members and central block. Thus, the tubular members can translate and rotate with respect to the block and are not limited to rotation about pivot axes.

Another advantage provided by the joint of the present invention is that it offers great strength when a force is applied downwards on portions of the tubular members spaced from the joint or on the joint. The provision of the guide plates 76, together with the positioning of the follower portions of the pins 20 in the guide passages 42, prevents any tendency of the tubular members to move in response to the application of a downward force on either the tubular members or the central block member. A still further advantage is that the flanges 38 and 40 of the central block member provide lateral support for the ends of the tubular members so that the folding joint provides good resistance to lateral forces applied against either the block member or the tubular members.

While preferred forms and arrangements have been shown in illustrating the invention, it is to be clearly understood that various changes in detail and arrangement may be made without departing from the spirit and scope of this disclosure.

I claim:

1. A joint for interconnecting confronting end portions of two elongate members so that the elongate members are movable between a first position in which the elongate members are coaxial and their confronting end portions are spaced a first predetermined distance from each other and a second position in which the elongate members are parallel with each other and spaced apart by a second distance greater than said first predetermined distance, said joint comprising:
    a central block member having a base and a flange protruding downwardly from a side edge of the base, the flange having a pair of guide passages formed therein that extend inwardly and upwardly from lower outer edges thereof and respective cam slot formed within the flange above each of the entrances to the guide passages;
    a guide member pivotally connected to each lower outer edge of said flange below the entrances to the guide passages, each guide member having a guide passage with an entrance that communicates with the entrance to one of the guide passages in the flange and a cam slot that at least partially overlaps the respective cam slot in the flange, the guide passages in the flange and guide member cooperating with each other to define a guide path traversing 90°, the cam slots in the flange and guide member being shaped to cooperate with each other to limit movement of said guide member to positions corresponding to the first and second positions of the elongate members;
    a pin received in and cooperating with overlapping portions of said cam slots for limiting movement of said guide member;
    follower means carried by the confronting end portion of each elongate member received in said guide path for guiding movement of the elongate member between its first and second positions;
    guide means for slidably receiving and guiding said elongate member;
    means for connecting said guide means to said guide member; and holding means for releasably holding said elongate members in said first positions.

2. A joint according to claim 1, wherein a flange having guide passages and cam slots protrudes downwardly from both side edges of the base of said central block member.

3. A joint according to claim 1 or claim 2, wherein said holding means comprises biasing means having one end portion connected to a central portion of said central block member and an opposite end portion connected to one of said elongate members for urging said elongate member towards the first position thereof.

4. A joint according to claim 2, wherein said central block member further comprises guide plates protruding downwardly from lower outer portions of said base, said guide plates being positioned to contact upper portions of said elongate members and limit rotation thereof with respect to said central block member.

5. A joint according to claim 1 or 2, wherein said guide path has an inner end closely spaced from the center of said central block member, and wherein each of said guide members has an extension thereof movable into a position holding said follower means in said inner end of said guide path when said elongate members are in said first position, said extensions comprising said holding means.

6. A joint for interconnecting confronting end portions of two tubular members, each end portion carrying a pin having ends protruding beyond edges of the tubular member, said joint comprising:
    a guide sleeve encompassing and slideably guiding each of the tubular members;
    a central block member comprising a generally U-shaped member having a base and downwardly extending flanges, each of the flanges having a pair of guide passages formed therein that extend inwardly and upwardly from entrances opening to lower outer edges of the flanges, a pair of closed cam slots positioned between the base and respective ones of the entrances to the guide passages, an opening formed below each of the entrances to the guide passages, and an opening in the central region of the flange;

a bolt extending through the central openings in the flanges and secured to said central block member;

a plurality of guide members, each guide member having an opening alignable with one of the openings formed in the flange below one of the guide passage entrances, a guide passage having an entrance communicating with the entrance to one of the guide passages formed in the flange, and a cam slot at least partially overlapping one of the cam slots in the flange, said guide passages of said flange and said guide member forming a guide path receiving one of the ends of said pin carried by the tubular member and being shaped to control movement of the tubular member through an angular distance of 90°;

means received in overlapping portions of said cam slots formed in said flange and said groove member for limiting movement of said guide member;

means for interconnecting respective ones of said guide members and said guide sleeves so that said guide sleeves are movable through an arc of 90°;

means interconnected between said bolt and said tubular members for urging said tubular members towards said bolt, said tubular members being movable between aligned positions in which said confronting ends are closely spaced from said bolt and positions rotated 90° in opposite directions away from the aligned positions; and means for holding said tubular members in said aligned positions.

* * * * *